(12) United States Patent
Rahat et al.

(10) Patent No.: US 10,440,159 B2
(45) Date of Patent: Oct. 8, 2019

(54) HEADER MODIFICATION FOR SUPPLEMENTARY SERVICES

(71) Applicant: T-Mobile USA, Inc., Bellevue, WA (US)

(72) Inventors: Adnan Rahat, Newcastle, WA (US); Yasmin Karimli, Kirkland, WA (US); Gunjan Nimbavikar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 28 days.

(21) Appl. No.: 15/668,359

(22) Filed: Aug. 3, 2017

(65) Prior Publication Data

US 2019/0045036 A1 Feb. 7, 2019

(51) Int. Cl.
*H04L 29/06* (2006.01)
*H04L 12/851* (2013.01)
*H04L 29/08* (2006.01)

(52) U.S. Cl.
CPC .......... *H04L 69/22* (2013.01); *H04L 47/2483* (2013.01); *H04L 67/2804* (2013.01); *H04L 67/32* (2013.01)

(58) Field of Classification Search
CPC ....... H04L 12/741; H04L 29/06; H04L 45/74; H04L 24/02
See application file for complete search history.

(56) References Cited

U.S. PATENT DOCUMENTS

| | | | |
|---|---|---|---|
| 6,611,498 B1 | 8/2003 | Baker et al. | |
| 2006/0083242 A1 | 4/2006 | Pulkkinen | |
| 2007/0121602 A1 | 5/2007 | Sin et al. | |
| 2009/0168985 A1* | 7/2009 | Yu | H04L 12/1822 379/202.01 |
| 2009/0168986 A1 | 7/2009 | Jackson et al. | |
| 2011/0103372 A1 | 5/2011 | Shatsky et al. | |
| 2011/0202609 A1* | 8/2011 | Chaturvedi | H04L 29/125 709/206 |
| 2015/0178649 A1* | 6/2015 | Furman | G06Q 10/06312 705/7.22 |
| 2017/0168864 A1* | 6/2017 | Ross | G06F 9/45558 |
| 2018/0007213 A1* | 1/2018 | Mandanapu | H04L 12/1435 |

OTHER PUBLICATIONS

PCT Search Report and Written Opinion dated Dec. 5, 2018 for PCT Application No. PCT/US2018/043480, 14 pages.

* cited by examiner

*Primary Examiner* — Mewale A Ambaye
(74) *Attorney, Agent, or Firm* — Lee & Hayes, P.C.

(57) ABSTRACT

Handling supplementary services offered in association with Internet Protocol multimedia services based on particular policies is described. In an example, server(s) can receive, from a first user device, a policy associated with handling one or more communications directed to a particular identifier. The server(s) can subsequently receive a communication from a second user device, the communication being associated with a header identifying the particular identifier as the intended recipient of the communication. The server(s) can determine whether the policy is to be applied to the communication and, based at least partly on determining that the policy is to be applied to the communication, the server(s) can update the header based at least in part on the policy. The server(s) can transmit the communication based at least in part on the header, thereby transmitting the communication pursuant to the policy.

14 Claims, 6 Drawing Sheets

HEADER MODIFICATION FOR SUPPLEMENTARY SERVICES

BACKGROUND

Internet Protocol Multimedia Subsystem (IMS) is an architectural framework for delivering Internet Protocol (IP) multimedia services. IMS leverages an integrated network of telecommunications carriers to facilitate the use of IP for packetized communications in various known forms over wireless networks and/or landlines. Examples of such communications include, but are not limited to, traditional telephony, fax, email, Internet access, Web services, Voice over IP (VoIP), instant messaging (IM), video conference sessions, and video on demand (VoD). IMS utilizes a dedicated interface (e.g., Ut interface) and network functionalities which enable management of supplementary services (e.g., call forwarding, call barring, etc.) and/or presence information for a user device. For instance, for VoLTE, the Ut interface is defined in the GSMA IR.92 and 3GPP TS 24.623, TS 24.423 and 3GPP TS 33.222 standards.

IP multimedia services leverage an IP header format (e.g., a header) which provides information to server(s) provisioning IP multimedia services. A header can correspond to data that is appended to a communication. In an example, the header can include source and destination IP addresses to identify a sender (e.g., source) and intended recipient (e.g., destination) of the communication. The header can also include additional information which identifies a version (used to identify the IP version being used), a header length (used to identify a length of the header), a type of service, an IP precedence (used to identify a level of service a packet receives in a network), a differentiated services code point (used to identify a level of service a packet receives in a network), a total length (used to identify a length of the header and the communication), a protocol (used to determine which application the data is from or which application the data is for), etc.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
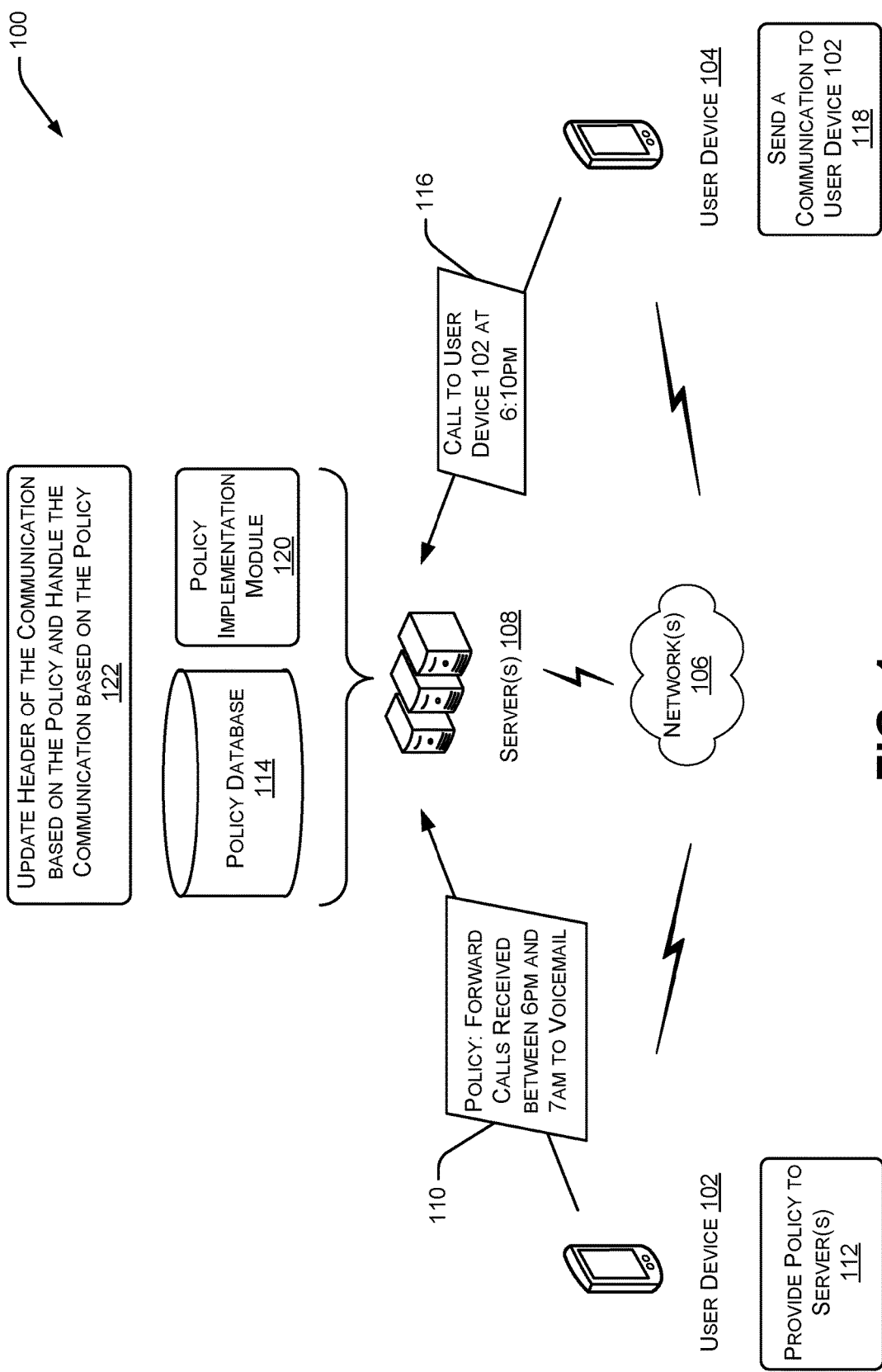
FIG. 1 illustrates an environment for modifying a header of a communication for handling supplementary services.

In examples of the present disclosure, handling supplementary services offered in association with Internet Protocol (IP) multimedia services based on particular policies is described. More specifically, techniques described herein are directed to receiving, at one or more servers and from a user device, a policy (e.g., data associated with the policy) providing one or more instructions for handling one or more communications addressed to a particular identifier. In at least one example, an identifier can identify a network location (e.g., an address) of an entity. For the purpose of this discussion, an identifier can be an account number, an international mobile subscriber identity (IMSI), a telephone number, a Mobile Station International Subscriber Directory Number (MSISDN), an IP Multimedia Public Identifier (IMPU), an email address, or any other identifier that uniquely identifies a location of an entity. As described herein, an entity can correspond to a user device, a voice mailbox, an email repository, etc.

In at least one example, based on receiving the policy, the one or more servers can store the policy in association with a profile of a user corresponding to the identifier. The one or more servers can receive a communication from another user device. The communication can include a header including the identifier as the intended recipient of the communication. Upon receiving the communication, the one or more servers can perform a look-up, or some other search, to determine whether a policy is applicable to the communication, for instance, based on the identifier. Based at least in part on determining that a policy is applicable to the communication, the one or more servers can modify at least a portion of a header based on the policy. The one or more servers can transmit the communication based at least in part on the header.

Policies can be associated with supplementary services offered in association with IP multimedia services. In some examples, a policy can be associated with a supplementary service providing communication forwarding. That is, in such examples, a policy can provide one or more instructions for routing one or more communications addressed to a first identifier to a second identifier. As a non-limiting example, one or more communications addressed to the first identifier, which can correspond to a first user device, can be routed to a voice mailbox associated with the first identifier. In such an example, the voice mailbox can be associated with a different identifier than the first identifier (e.g., the second identifier). In another non-limiting example, one or more communications addressed to the first identifier, which can correspond to the first user device, can be routed to a second identifier associated with a second user device that is different than the first user device. In other examples, for instance, where the first user device includes device, line, and/or account sharing capabilities, one or more communications addressed to the first identifier, which can correspond to the first user device, can be routed to a second identifier (e.g., an alternate line and/or alternate account) that is also associated with the first user device.

In at least one example, a policy can be associated with a supplementary service of communication barring. That is, in such examples, a policy can provide one or more instructions for barring incoming communications from certain identifier(s). In yet additional and/or alternative examples, a policy can be associated with a supplementary service of communication holding. That is, in such examples, a policy can provide one or more instructions for delaying the transmission of one or more communications addressed to a first identifier. In such examples, the one or more communications may not be real-time communications. Additional and/or alternative policies that affect additional and/or alternative supplementary services can be imagined.

In some examples, a policy can be associated with various constraints, such as a duration of operation, a geographical location of operation, a roaming status of operation, etc. For instance, a policy can be associated with a duration defined by a start time and/or start date and an end time and/or end date. Or, a policy can be associated with a duration that is in effect unless and/or until instructions are received for ending operation of the policy. Moreover, a policy can be implemented when a source user device and/or intended recipient user device is located within (or outside of) a particular geographical location. Or, a policy can be implemented when a source user device and/or intended recipient user device is roaming (or not roaming). Additional details associated with various constraints are described below.

As described above, IP multimedia services leverage an IP header format (e.g., a header) which provides information to server(s) provisioning IP multimedia services. A header can correspond to data that is appended to a communication. In an example, the header can include source and destination IP addresses to identify a sender (e.g., source) and intended recipient (e.g., destination) of the communication. The header can also include additional information which identifies a version (used to identify the IP version being used), a header length (used to identify a length of the header), a type of service, an IP precedence (used to identify a level of service a packet receives in a network), a differentiated services code point (used to identify a level of service a packet receives in a network), a total length (used to identify a length of the header and the communication), a protocol (used to determine which application the data is from or which application the data is for), etc., as described above. In at least one example, the one or more servers can modify and/or add additional information to a header associated with an incoming communication. For instance, the one or more servers can modify the destination IP address (e.g., the identifier of the intended recipient) based on a policy that includes one or more instructions to route incoming communications to a recipient other than the intended recipient. Additionally and/or alternatively, the one or more servers can add at least a portion of the policy into the header. The one or more servers can transmit the communication based on the header. Additional details are described below.

FIG. 1 illustrates an environment 100 for modifying a header of a communication for handling supplementary services.

As illustrated in FIG. 1, a first user device 102 can communicate with a second user device 104 via network(s) 106. In at least one example, network(s) 106 can include a cellular network, the Internet, and/or other network(s). The server(s) 108 can facilitate the exchange of communication(s) between user device(s) 102, 104, etc. via the network(s) 106. In at least one example, the server(s) 108 can be associated with a telecommunications service provider.

In at least one example, the first user device 102 can provide data 110 associated with a policy (e.g., a policy) to the server(s) 108, as illustrated by block 112. As described above, a policy can provide one or more instructions for handling communications that are directed to an identifier corresponding to the first user device 102. In some examples, the policy can be associated with one or more constraints, as described above. In at least one example, the first user device 102 can send a request to initiate a policy to the server(s) 108. For instance, a user operating the first user device 102 can interact with a web portal, an application, etc. to generate and send the request. The server(s) 108 can receive the request and can send one or more policy options to the first user device 102. The one or more policy options can include various operations that can be effectuated by the server(s) 108 for handling communications that are directed to an identifier corresponding to the first user device 102. In at least one example, the one or more policy options can be associated with various constraints (e.g., duration(s), geographical location(s), roaming status(es), etc.) for implementing the various operations. In some examples, the user can provide input to specify the operation(s) of the policy and/or the constraint(s). For instance, the user can provide input to initiate call forwarding for a particular period of time (e.g., between 6:00 pm and 7:00 am), as shown in the data 110 associated with the policy.

In other examples, an application (e.g., a settings application, etc.) stored on the first user device 102 can store one or more policy options (or indications thereof) locally. In such an example, the user can access the one or more policy options via the application of the first user device 102 and can specify the operation(s) of the policy and/or the constraint(s) associated with the policy via the application. In at least one example, the one or more policy options can be predetermined and the user can select the predetermined policy option(s) via the application.

The server(s) 108 can receive the data 110 associated with the policy and can store the data 110 in a policy database 114. In at least one example, the policy database 114 can store data such that it is accessible, manageable, and/or updateable. In some examples, the policy database 114 can be organized based on user profiles (e.g., subscriber account profiles). In at least one example, the policy database 114 can include one or more policies that are mapped to, or otherwise associated with, one or more user profiles. Additional details associated with the policy database 114 are described below.

In at least one example, the second user device 104 can send a communication 116 (e.g., a call) that is addressed to an identifier corresponding to the first user device 102, as illustrated in block 118. In such an example, the communication 116 can be associated with a header, as described above. The header can include data identifying an identifier associated with the second user device 104 as the source, an identifier associated with the first user device 102 as the intended recipien), etc.

The server(s) 108 can receive the communication 116. In at least one example, the server(s) 108 can include a policy implementation module 120. The policy implementation module 120 can analyze the header associated with the communication to determine an intended recipient of the communication. That is, the policy implementation module 120 can analyze the header associated with the communication to determine the identifier corresponding to the first user device 102. The policy implementation module 120 can perform a look-up, or some other search, to determine whether the intended recipient of the communication is associated with a policy. That is, the policy implementation module 120 can query the policy database 114 to determine whether the identifier corresponding to the first user device 102 is associated with a policy.

Based at least in part on determining that the identifier corresponding to the first user device 102 is associated with a policy, and determining that the policy is valid, the policy implementation module 120 can update the header of the communication 116 based on the policy, and can handle the communication 110 based on the policy, as block 122 illustrates. In at least one example, the policy implementation module 120 can analyze the communication 116 to determine whether the policy is valid, as described below. In the example provided in FIG. 1, the communication 116 is associated with a timestamp of 6:10 pm. Per the policy provided by the first user device 102 (e.g., in data 110), calls received between 6:00 pm and 7:00 am are to be routed to voicemail. Because 6:10 pm is after 6:00 pm and before 7:00 am, the policy implementation module 120 can determine that the policy is valid.

In at least one example, the policy implementation module 120 can change the intended recipient of the communication 116 by modifying the identifier indicating the intended recipient in the header. For instance, in the non-liming example, the policy implementation module 120 can change the identifier corresponding to the intended recipient, which can correspond to the first user device 102, to a different identifier corresponding to a voice mailbox associated with the first identifier pursuant to the policy provided by the first user device 102. In additional and/or alternative examples, the policy implementation module 120 can add at least a portion of the policy to the header. For instance, in the non-limiting example, the policy implementation module 120 can update the header to include information about the policy (e.g., forward calls to voice mailbox) and the duration (e.g., from 6:00 pm to 7:00 am). Based on updating the header, the server(s) 108 can transmit the communication 116 pursuant to the header and the policy.

Accordingly, pursuant to the policy identified in the data 110, the server(s) 108 can send the communication 116 directly to a voice mailbox associated with the first user device 102. That is, the communication 116 may not be sent to the first user device 102, but instead can be sent directly to the voice mailbox. In some examples, a user can be required to input a password, or otherwise authenticate his or her identity, to access the communication 116 that was sent directly to the voice mailbox associated with the first user device 102.

The environment depicted in FIG. 1 is but one example of an environment for facilitating updating headers for handling supplementary services, and the policy identified by the data 110 is but one example of a policy. Additional and/or alternative environments and/or policies can be imagined. For instance, while the example provided above is directed to a policy associated with call forwarding, in some examples, a policy can be associated with communication barring, communication holding, etc.

Figure 2:
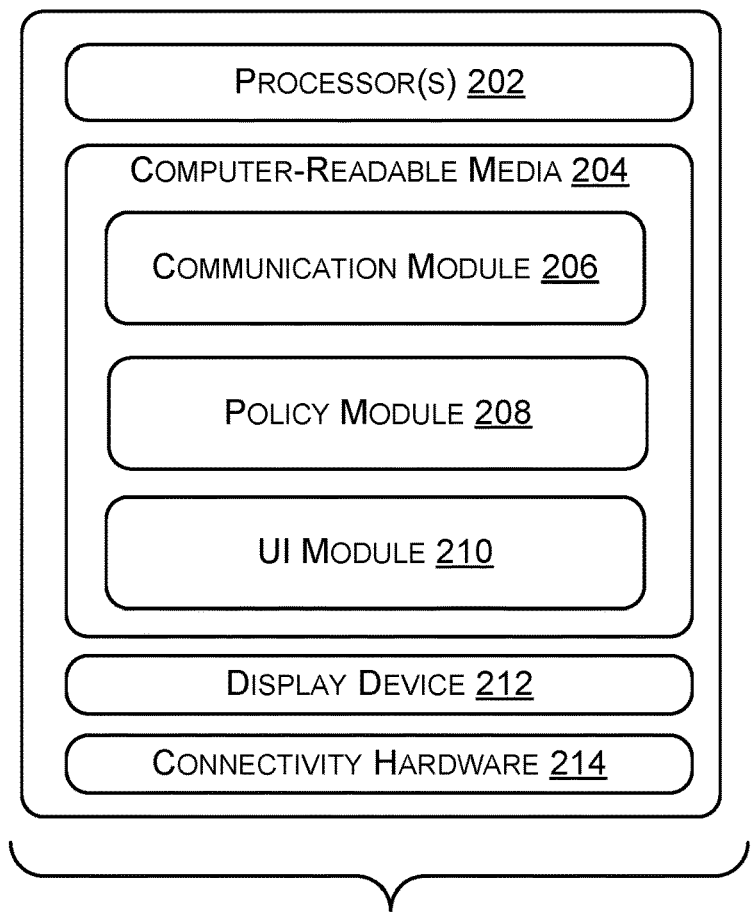
FIG. 2 illustrates an example user device configured to provide a policy for handling supplementary services.
Figure 2:
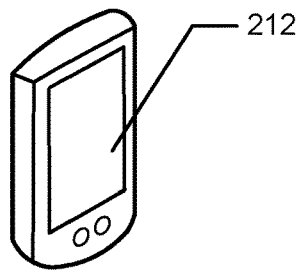

FIG. 2 illustrates an example user device 200 configured to provide a policy for handling supplementary services. User device 200 can correspond to user device 102, for example, as described above with reference to FIG. 1.

The user device 200 can be any device embedded with software and network connectivity such that it can exchange data with other device(s) and/or server(s). Non-limiting examples of a user device include a smart phone, a personal digital assistant, a netbook, a laptop computer, a tablet computer, a smart device, and/or another electronic device that is capable of sending or receiving voice, video, and/or data via a cellular network, the Internet, and/or one or more other network(s) (e.g., a Wi-Fi network, another access network, a short-range communication network, etc.).

In an example where the user device 200 is a mobile device, the mobile device can include a SIM card, which has an IMSI stored thereon and/or associated with a profile corresponding to the SIM card. An IMSI is a unique 64-bit number. Within a GSM network, the IMSI is associated with the MSISDN, sometimes referred to as the "Mobile Station International Subscriber Directory Number," or more commonly as the telephone number. The MSISDN is a unique number that identifies a subscription on a GSM network and is also the number that can be used to place a call to the GSM phone. The MSISDN is not necessarily stored on the SIM card or the phone, and the MSISDN is not permanently associated with the IMSI. The MSISDN can change if the subscription changes, for example.

In at least one example, the user device 200 can have device, line, and/or account sharing capabilities. In such an example, the user device 200 can be related to one or more other devices by sharing an identifier with the one or more other devices. That is, a user device (e.g., the user device 200) can be related to another user device if it shares a same line or account as the other user device. In an example, multiple user devices can be registered with a common number (e.g., MSISDN, IMPU, IMPI, etc.) ("line," as used herein) and/or can be associated with a common subscriber account (e.g., IMSI) ("account," as used herein), and thus are "related devices," as used herein. For example, some of the related devices can have their own unique IMSI programmed into their respective SIM cards, and which are associated with a specific telephone number (MSISDN), which can also be unique to each related device. But the IMSI and MSISDN pair can be associated in the network with "alias numbers" to allow for shared lines and/or shared accounts, thereby making them related devices. In at least one example, as a related device, the user device 200 can receive incoming calls and/or messages sent to an identifier of a common line and/or account.

In some examples, the user device 200 can be associated with more than one identifier. That is, in such examples, the user device 200 can be associated with one or more numbers (e.g., MSISDN, IMPU, IMPI, etc.) ("lines," as used herein) and/or one or more subscriber accounts (e.g., IMSI) ("accounts," as used herein). In such examples, the user device 200 can receive incoming calls and/or messages when any one of the one or more identifiers is the intended recipient of the incoming calls and/or messages.

Processor(s) 202 can represent, for example, a central processing unit (CPU)-type processing unit, a graphics processing unit (GPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 202 can execute one or more modules and/or processes to cause the user device 200 to perform a variety of functions, as set forth above and explained in further detail in the following disclosure. Additionally, each of the processor(s) 202 can possess its own local memory, which also can store program modules, program data, and/or one or more operating systems.

Depending on the exact configuration and type of the user device 200, the computer-readable media 204, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. Computer-readable media 204 is an example of non-transitory computer-readable media. Non-transitory computer-readable media include, but are not limited to, RAM, ROM, EEPROM, flash memory or other memory technology, CD-ROM, DVD or other optical storage, magnetic cassettes, magnetic tape, magnetic disk storage or other magnetic storage devices, or any other tangible, physical medium which can be used to store the desired information and which can be accessed by the user device 200. Any such non-transitory computer-readable media can be part of the user device 200.

In contrast, communication media includes computer readable instructions, data structures, program modules, or other data in a modulated data signal, such as a carrier wave, or other transmission mechanism. As defined herein, computer storage media does not include communication media.

The computer-readable media 204 can include one or more modules and data structures including, for example, a communication module 206, a policy module 208, and/or a user interface (UI) module 210. The one or more modules and data structures can be in the form of stand-alone applications, productivity applications, an operating system component, or any other application or software module having data items that facilitate interactions between user device(s), server(s), and/or one or more networks (e.g., cellular network(s), Internet, other network(s), etc.), as described herein.

The communication module 206 can facilitate communications between user device(s) and/or server(s). For instance, the communication module 206 can facilitate sending calls, messages, etc. to one or more other user devices and/or receiving calls, messages, etc. from one or more other user devices.

The policy module 208 is configured to provide data associated with a policy to server(s). As described above, a policy can provide one or more instructions for handling communications that are directed to a particular identifier, which may or may not be associated with the user device 200. In at least one example, the policy module 208 can send a request to initiate a policy to the server(s). For instance, a user operating the user device 200 can interact with a web portal, an application, etc. to generate and send the request to initiate the policy. The server(s) can receive the request and can send one or more policy options to the user device 200. That is, the policy module 208 can receive one or more policy options from the server(s). The one or more policy options can include various operations that can be effectuated by the server(s) for handling communications that are directed to the particular identifier. Furthermore, the one or more policy options can include various constraints that can be applicable to the operations. In some examples, the user can provide input to specify the operation(s) of the policy and/or the constraint(s) of the policy.

As an example, a policy option can be associated with an operation for re-routing communication(s) that are directed to an identifier associated with the user device 200. The one or more policy options can enable the user to indicate a location to which the communication(s) should be re-routed. For instance, the user can indicate a voice mailbox associated with the identifier (which can be associated with its own identifier), another device (which can be associated with its own identifier or the identifier), or an alternate identifier associated with the user device 200 to which the communication(s) should be re-routed. Additionally and/or alternatively, a policy option can be associated with an operation of barring incoming communication(s) associated with particular identifier(s), delaying transmission of communication(s), etc. A user can provide input indicating which operation(s) to implement for communication(s) directed to the identifier corresponding to the first device.

In at least one example, the one or more policy options can be associated with various constraint(s) that are applicable to implementing a policy, such as, but not limited to, duration(s), geographical location(s) (e.g., of the source user device and/or the intended recipient user device), roaming status(es) (e.g., of the source user device and/or the intended recipient user device), etc. Duration can refer to a period of time during which a policy is to be implemented. In an example, a policy option can enable a user to specify a particular start time for implementing a policy and a particular end time for terminating the implementation of the policy. Or, a duration can be specified by a particular start date for implementing a policy and a particular end date for implementing the policy. In some examples, a user can specify that a duration is recurring. In additional and/or alternative examples, a duration can be specified by an expiration date and/or time such that the policy is to be implemented until the expiration date and/or time occurs.

In at least one example, a geographical location can correspond to a physical boundary and/or a virtual boundary (e.g., a geofence). In an example, a policy option can enable a user to specify a geographical location within which (or outside of which) a particular policy is to be implemented. In some examples, the constraint can be associated with a geographical location of the source user device. In other examples, the constraint can be associated with a geographical location of the intended recipient user device. A roaming status can correspond to an indication as to whether a user device is located outside of a service provider's coverage area. In an example, a policy option can enable a user to specify that a particular policy is to be implemented when a user device is roaming (or not roaming). In some examples, the constraint can be associated with a roaming status of the source user device. In other examples, the constraint can be associated with a roaming status of the intended recipient user device.

As described above, in some examples, the policy module 208 can receive one or more policy options from the server(s). In additional and/or alternative examples, an application (e.g., a settings application, etc.) stored on the user device 200 can store one or more policy options (or indications thereof) locally. In such an example, the user can access the one or more policy options via the application of the user device 200 and can specify the operation(s) of the policy and/or the constraint(s) of the policy via the application. As described above, in an alternate example, the one or more policy options can be predetermined and the user can select the predetermined policy option(s) via the application.

The policy module 208 can send data indicating policy option(s) input by the user to the server(s). One or more policy options can collectively represent a policy. Accordingly, the policy module 208 can send data indicating the policy to the server(s). In at least one example, in response to sending the data indicating policy option(s), the policy module 208 can receive an authentication notification from the server(s) indicating that the server(s) received the data indicating the policy option(s).

In some examples, a user can interact with the user device 200 to establish a policy associated with an identifier corresponding to the user device, as described above. In additional and/or alternative examples, a user can interact with the user device 200 to establish a policy associated with an identifier that does not correspond to the user device 200. For instance, in such examples, a user can interact with the user device 200 to establish a policy associated with an identifier that corresponds to a different user device which associated with its subscriber account.

The UI module 210 can be configured to present graphical user interface(s) via a display device 212 of the user device 200. In some examples, the UI module 210 can receive instructions for generating a graphical user interface configured to present policy option(s) to a user, via the display device 212. In additional and/or alternative examples, the UI module 210 can receive instructions for generating a graphical user interface configured to present the authentication notification via the display device 212. The UI module 210 can also receive instructions for generating graphical user interface(s) for notifying a user of incoming communication(s) and/or generating outgoing communication(s).

The user device 200 can include a display device 212, which can be an output device for visually presenting data. Examples of display devices include light-emitting diode (LED) displays, liquid crystal displays (LCD), cathode ray tube (CRT) displays, etc.

Furthermore, the user device 200 can include connectivity hardware 214. In at least one example, connectivity hardware 214 can include network hardware, which provides wired or wireless networking capabilities to the user device 200. The network hardware can include or be incorporated into processors, ASICs, programmable circuits such as FPGAs, or in other ways. The software modules stored on the computer-readable media 404 are configured to access hardware via interrupts, calling APIs, and the like. The software modules can also be configured to pass information to one another, such as through APIs, storing commands, parameters, etc. in a predetermined memory location, etc. Other examples are possible without departing from the scope of this disclosure.

In additional and/or alternate examples, the connectivity hardware 214 can include radio hardware, which provides wireless capabilities, such as connecting to a cellular network base station, a Wi-Fi network, or other wireless networks. The radio hardware can include or be incorporated into processors, ASICs, programmable circuits such as FPGAs, or in other ways. The software modules stored on the computer-readable media 204 are configured to access hardware via interrupts, calling APIs, and the like. The software modules can also be configured to pass information to one another, such as through APIs, by storing commands, parameters, etc. in a predetermined memory location, etc. Other examples are possible without departing from the scope of this disclosure.

Figure 3:
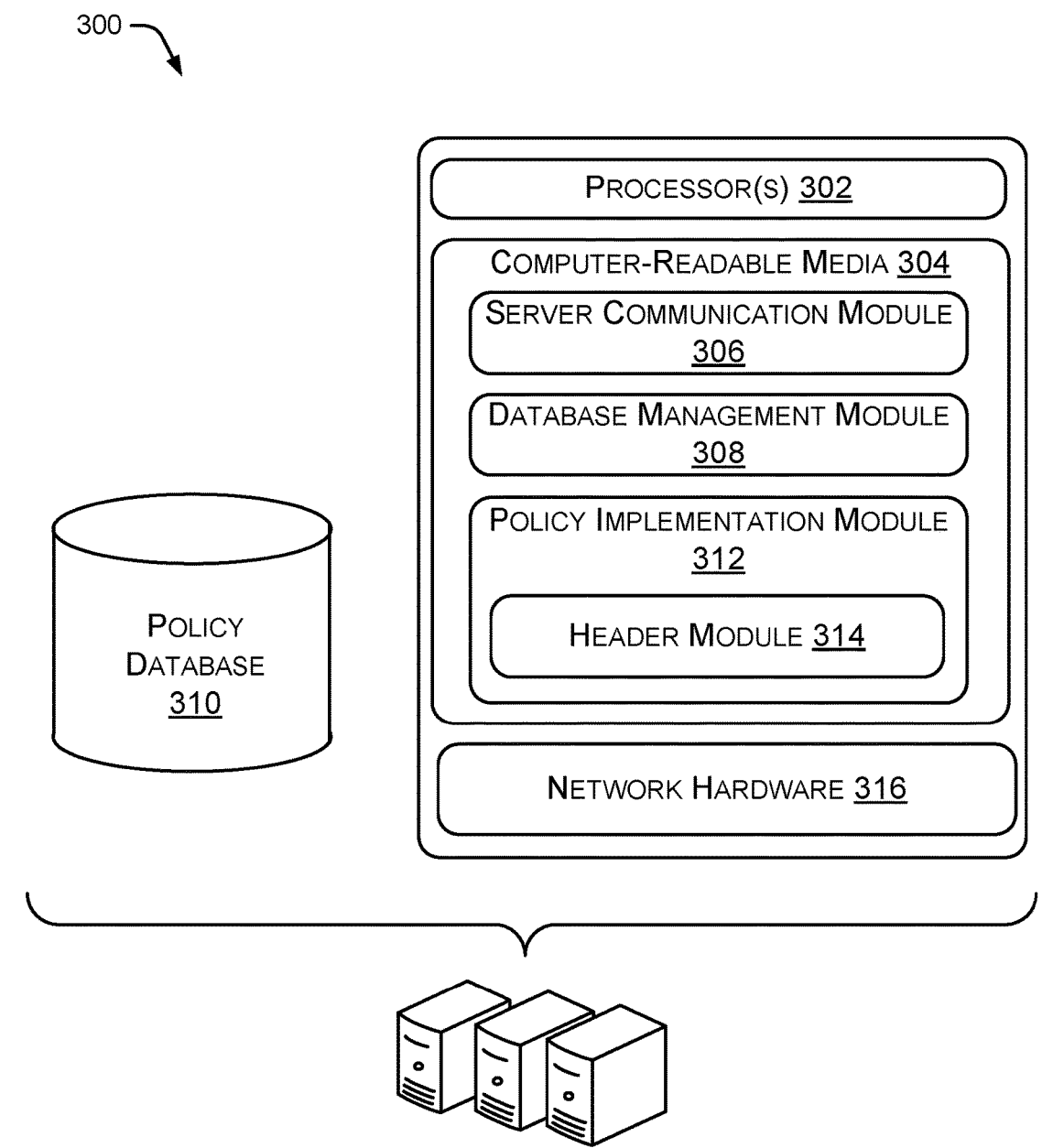
FIG. 3 illustrates example server(s) configured to handle supplementary services based on a policy.

FIG. 3 illustrates example server(s) 300 configured to handle supplementary services based on a policy. The server(s) 300 can correspond to server(s) 108 described above with reference to FIG. 1. The server(s) 200 can be any type of server, such as a network-accessible server. The server(s) 300 include processor(s) 302 and computer-readable media 304. Processor(s) 302 can have the same or similar functionality as processor(s) 202 and computer-readable media 304 can have the same or similar functionality as computer-readable media 204, described above.

The computer-readable media 304 can include one or more modules and data structures including, for example, a server communication module 306, a database management module 308 for managing a policy database 310, and a policy implementation module 312, which can include a header module 314. In an example, the policy implementation module 312 and the header module 314 may correspond to the policy implementation module 120 described above with reference to FIG. 1. The one or more modules and data structures can be in the form of stand-alone applications, productivity applications, an operating system component, or any other application or software module having data items that facilitate interactions between the server(s) 300, one or more user devices, and/or one or more networks (e.g., cellular network(s), Internet, and/or other network(s)), as described herein.

The server communication module 306 can be configured to facilitate sending and receiving communications. In at least one example, the server communication module 306 can include a telephony application server that can be used for voice, message, and video communications via network(s) to user devices (e.g., user device 200, etc.). That is, the server communication module 306 can facilitate sending and receiving calls, messages, etc. to and/or from user devices. In at least one example, the server communication module 306 can receive a communication and can route the communication to the intended recipient based on the header associated with the communication.

The database management module 308 can be configured to manage a policy database 310. In at least one example, the server(s) 300 can be associated with a policy database 310. In some examples, the policy database 310 can be integral to the server(s) 300. In other examples, the policy database 310 can be communicatively coupled to the server(s) 300. In at least one example, the policy database 310 can correspond to the policy database 114 described above with reference to FIG. 1. In at least one example, the policy database 310 can store data such that it is accessible, manageable, and/or updateable, as described above. In some examples, the policy database 310 can be organized based on user profiles (e.g., subscriber account profiles). In at least one example, the policy database 310 can include one or more policies that are mapped to, or otherwise associated with, one or more user profiles. In some examples, a user profile can be associated with one or more identifiers. In such examples, a policy can be mapped to, or otherwise associated with, an individual identifier of the one or more identifiers, or to more than one identifier of the one or more identifiers. In some examples, each identifier of the one or more identifiers can be associated with a different policy. In other examples, the one or more identifiers, or a subset thereof, can be associated with a same policy.

The database management module 308 can be configured to define the policy database 310, create the policy database 310, receive and/or determine data that is stored in the policy database 310, analyze the data that is stored in the policy database 310, update the data that is stored in the policy database 310, and otherwise administer the policy database 310. For instance, in at least one example, the database management module 308 can receive data associated with a policy from a user device (e.g., user device 200). In some examples, the data associated with the policy can be received responsive to sending one or more policy options to the user device (e.g., user device 200). In such examples, the user device can send a request to initiate a policy. Responsive to the request, the database management module 308 can send one or more policy options (which can be stored in a database associated with the server(s)) to the user device. A user can provide input via the user device to select one or more policy options, which can be provided to the database management module 308 as data associated with a policy. In other examples, the data associated with the policy can be received without the database management module 308 sending one or more policy options to the user device. As described above, in some examples, one or more policy options (or indications thereof) can be stored locally on a user device and a user can select one or more policy options via the locally stored one or more policy options. The user selection(s) can be provided to the database management module 308 as data associated with a policy.

In at least one example, the data associated with the policy can identify one or more policy options (e.g., operation(s), constraint(s), etc.) selected by a user, which collectively define the policy. The data associated with the policy can be associated with an identifier. The database management module 308 can utilize the identifier to map, or otherwise associate, the policy with the identifier, which can be associated with a user profile. That is, the database management module 308 can map, or otherwise associate, data identifying the policy with the identifier. In at least one example, based at least in part on the database management module 308 mapping, or otherwise associating, the policy with the identifier, the database management module 308 can send an authentication notification to the user device (e.g., user device 200) indicating that the data associated with the policy has been received and processed by the database management module 308.

In some examples, the database management module 308 can experience a problem (e.g., network connectivity, etc.), which can result in an error when the database management module 308 is attempting to process the data and/or map, or otherwise associate, the policy with the identifier. In at least one example, the database management module 308 can try to process the data and/or map, or otherwise associate, the policy with the identifier again before sending an error notification or other failure notification to the user device. In some examples, the database management module 308 can retry a predetermined number of times before sending an error notification or other failure notification to the user device.

In some examples, the server(s) 300 can be associated with additional and/or alternative database(s) (not shown in FIG. 3). For instance, in at least one example, the server(s) 300 can be associated with a relational database which can store line and/or account associations for related devices, a network activity database which can store entries corresponding to communications associated with the one or more devices, etc. In such examples, the database management module 308 can be configured to manage the additional and/or alternative database(s).

The policy implementation module 312 can be configured to access a communication received by the server communication module 306 and determine whether to apply a policy to the communication. Based at least in part on determining that a policy is applicable to the communication, the header module 314 can update a header associated with the communication so that the server communication module 306 can transmit the communication based on the header.

In at least one example, the policy implementation module 312 can access a communication received via the server communication module 306 to analyze the header associated with the communication. Based on analyzing the header, the policy implementation module 312 can determine an intended recipient of the communication. That is, the policy implementation module 312 can analyze the data associated with the header to determine an identifier corresponding to an intended recipient of the communication. The policy implementation module 312 can perform a look-up, or some other search, to determine whether the identifier corresponding to the intended recipient is associated with a policy. That is, the policy implementation module 312 can query the policy database 114 to determine whether the identifier corresponding to the intended recipient is associated with a policy.

Based at least in part on determining that the identifier is associated with a policy, the policy implementation module 312 can determine whether the policy is valid, and therefore applicable to the communication. In at least one example, the policy implementation module 312 can analyze constraint(s) associated with the policy to determine whether the policy is valid. As described above, a constraint can correspond to a duration of operation, a geographical location of operation, a roaming status of operation, etc. In at least one example, the policy implementation module 312 can access a time stamp associated with the communication (e.g., as indicated in the header) to determine, based on a duration constraint, whether a policy is applicable to the communication. If the communication is associated with a time that is within a duration of operation, the policy implementation module 312 can determine that the policy is valid and should be applied to the communication. If the communication is associated with a time that is not within the duration of operation, the policy implementation module 312 can determine that the policy is not valid and should not be applied to the communication. Or, in at least one example, the policy implementation module 312 can access a geographical location of the intended recipient to determine, based on a geographical location constraint, whether a policy is applicable to the communication. If the intended recipient (e.g., the user device associated with the identifier corresponding to the intended recipient) is in a geographical location where a policy is to be implemented, the policy implementation module 312 can determine that the policy is valid and should be applied to the communication. If the intended recipient (e.g., the user device associated with the identifier corresponding to the intended recipient) is outside of a geographical location where the policy is to be implemented, the policy implementation module 312 can determine that the policy is not valid and should not be applied to the communication. Additionally and/or alternatively, in at least one example, the policy implementation module 312 can access an indication as to whether the intended recipient is roaming to determine, based on a roaming status constraint, whether a policy is applicable to the communication. If the intended recipient (e.g., the user device associated with the identifier corresponding to the intended recipient) is roaming, the policy implementation module 312 can determine that the policy is valid and should be applied to the communication. Or, if the intended recipient (e.g., the user device associated with the identifier corresponding to the intended recipient) is not roaming, the policy implementation module 312 can determine that the policy is not valid and should not be applied to the communication.

Additionally and/or alternatively, the policy implementation module 312 can determine whether a communication is a type of communication to which a policy applies. For instance, a policy associated with communication holding may not be applicable for real-time communications. Accordingly, if a communication is a real-time communication, the policy implementation module 312 can determine that a policy associated with communication holding is not applicable to the communication and therefore is not valid. Or, if a communication is not a real-time communication, the policy implementation module 312 can determine that a policy associated with communication holding is applicable to the communication and therefore is valid. Moreover, in some examples, policies can be associated with expirations. That is, a policy can expire after a predetermined amount of time. In at least one example, the policy implementation module 312 can determine whether a policy has expired and, if the policy has expired, the policy implementation module 312 can determine that the policy is not valid. Or, in at least one example, the policy implementation module 312 can determine whether a policy has expired and, if the policy has not expired, the policy implementation module 312 can determine that the policy is valid.

The policy implementation module 312 can include a header module 314. The header module 314 can be configured to update header(s). That is, the header module 314 can be configured to modify data associated with a header appended to a communication and/or add new data to a header appended to a communication. Based at least in part on determining that the policy is valid, the policy implementation module 312 can send an instruction to the header module 314 to update the header of the communication based on the policy. In at least one example, the header module 314 can change the intended recipient of the communication by replacing the identifier associated with the intended recipient, as indicated in the header, with a new identifier corresponding to the new destination. For instance, in the non-liming example, the header module 314 can change the identifier indicative of the intended recipient, which can correspond to a particular user device, to an alternate identifier corresponding to a voice mailbox associated with the identifier, an alternate identifier associated with a different device, and/or an alternate identifier associated with the particular user device. In additional and/or alternative examples, the header module 314 can add at least a portion of the policy (e.g., operation(s), constraint(s), etc.) to the header. For instance, in the non-limiting example, the header module 314 can update the header to include information about an operation (e.g., forward calls to voice mailbox) and a duration (e.g., from 6:00 pm to 7:00 am). Or, as another non-limiting example, the header module 314 can update the header to include information about an operation (e.g., delay transmission of communication) and a geographical location (e.g., while outside of the United States).

Based on the header module 314 updating the header, the policy implementation module 312 can send the communication to the server communication module 306 and the server communication module 306 can transmit the communication pursuant to the header (which can reflect at least a portion of the policy).

Network hardware 316 provides wired or wireless networking capabilities to the server(s) 300. The network hardware 316 can include or be incorporated into processors, ASICs, programmable circuits such as FPGAs, or in other ways. The software modules stored on the computer-readable media 304 are configured to access hardware via interrupts, calling APIs, and the like. The software modules can also be configured to pass information to one another, such as through APIs, storing commands, parameters, etc. in a predetermined memory location, etc. Other examples are possible without departing from the scope of this disclosure.

Figure 4:
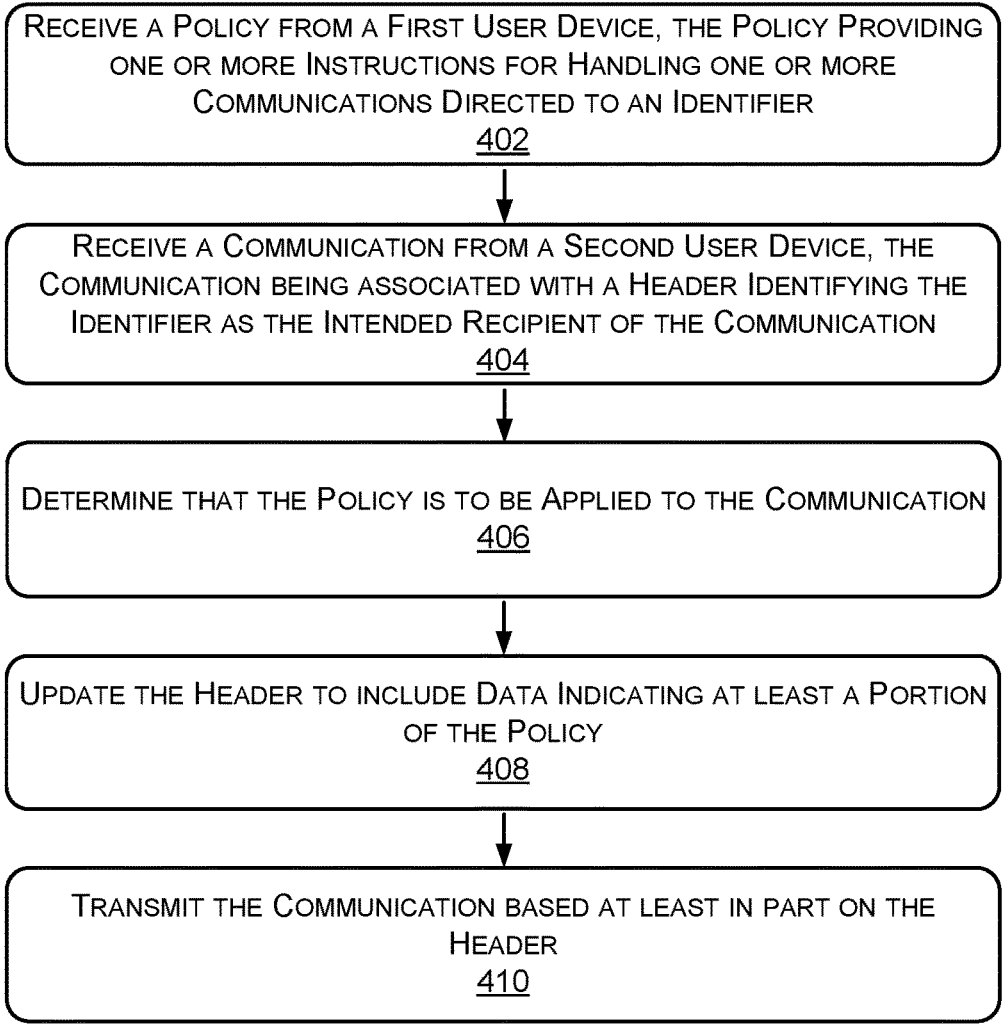
FIG. 4 illustrates an example process for transmitting a communication based at least in part on a header indicative of at least a portion of a policy.
Figure 5:
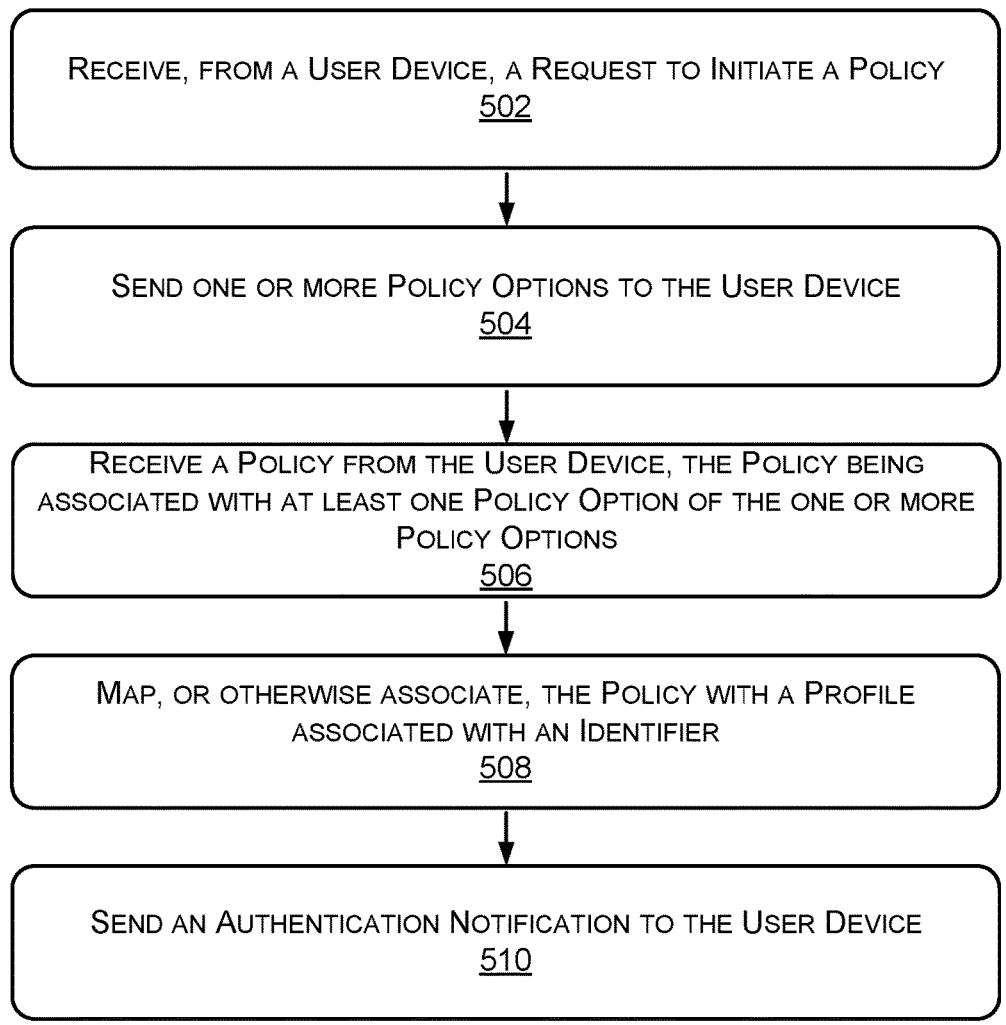
FIG. 5 illustrates an example process for establishing a policy that can be stored at and/or implemented by one or more servers.
Figure 6:
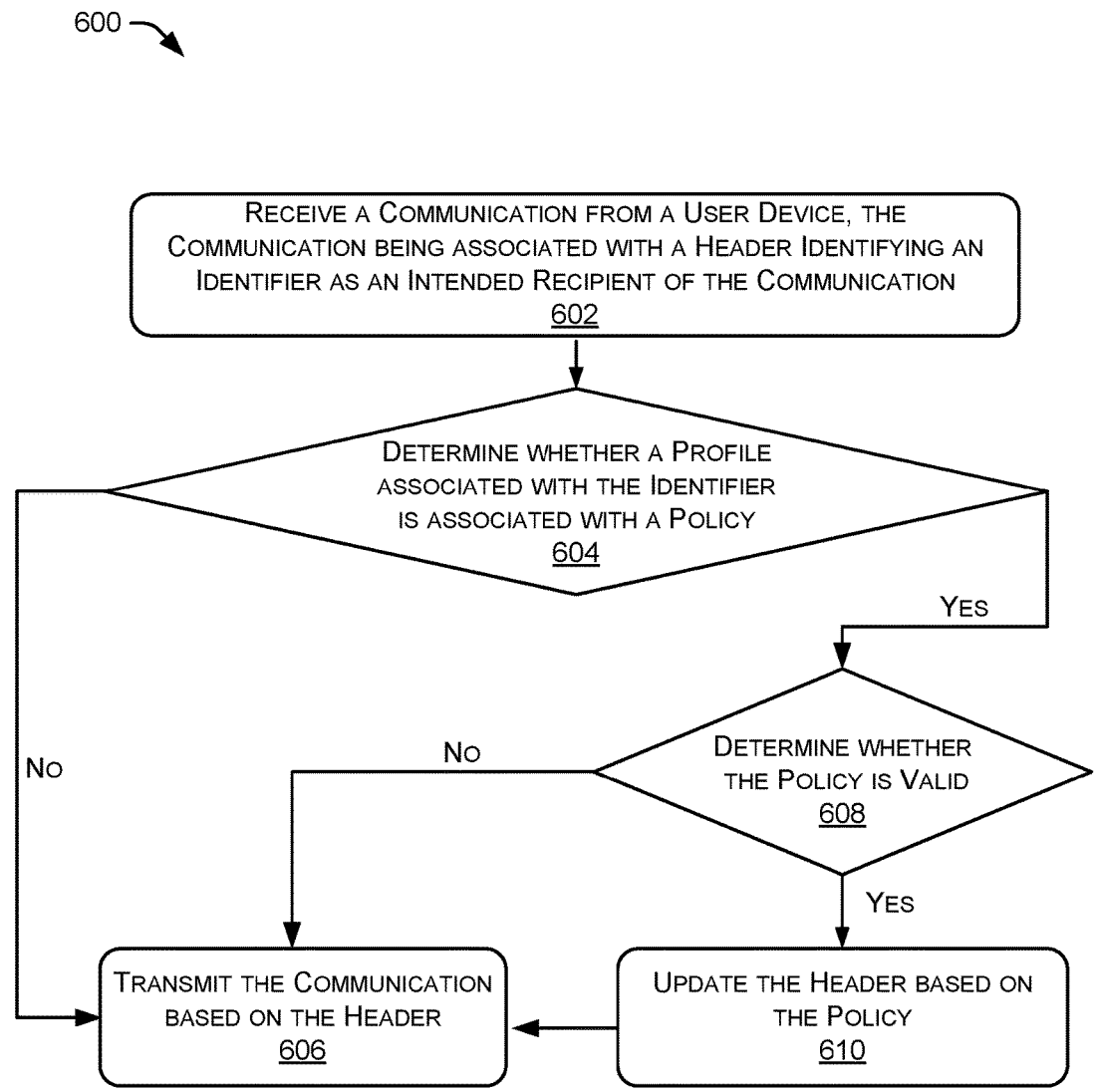
FIG. 6 illustrates an example process for determining whether a policy is applicable to a communication and transmitting the communication based on an applicable policy.

The processes described above in association with FIGS. 4-6 can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. In other embodiments, hardware components perform one or more of the operations. Such hardware components can include or be incorporated into processors, ASICs, FPGAs, or in other ways. The order in which the operations are described is not intended to be construed as a limitation, and any number of the described operations can be combined in any order and/or in parallel to implement the processes. FIGS. 4-6 are described below in the environments described above with reference to FIGS. 2 and 3, but are not limited to such environments.

FIG. 4 illustrates an example process 400 for transmitting a communication based at least in part on a header indicative of at least a portion of a policy.

Block 402 illustrates receiving a policy from a first user device, the policy providing one or more instructions for handling one or more communications directed to an identifier. As described above, in at least one example, the database management module 308 can receive data associated with a policy from a user device 200. The data can identify one or more policy options (e.g., operation(s), constraint(s), etc.) selected by a user, which collectively define the policy. Additional details associated with receiving a policy from a user device are described below with reference to FIG. 5.

Block 404 illustrates receiving a communication from a second user device, the communication being associated with a header identifying the identifier as the intended recipient of the communication. In at least one example, the server communication module 306 can receive a communication from the second user device. The communication can be associated with a header. As described above, the header can include source and destination addresses to identify a sender (e.g., an identifier associated with the second user device) and intended recipient (e.g., the identifier) of the communication. The header can also include additional information which identifies a version (used to identify the IP version being used), a header length (used to identify a length of the header), a type of service, an IP precedence (used to identify a level of service a packet receives in a network), a differentiated services code point (used to identify a level of service a packet receives in a network), a total length (used to identify a length of the header and the communication), a protocol (used to determine which application the data is from or which application the data is for), etc.

Block 406 illustrates determining that the policy is to be applied to the communication. In at least one example, the policy implementation module 312 can access the communication received via the server communication module 306 and can analyze the header associated with the communication. Based on analyzing the header, the policy implementation module 312 can determine an intended recipient of the communication (e.g., the identifier). That is, the policy implementation module 312 can analyze the data associated with the header to determine the identifier, which may or may not correspond to the first user device. The policy implementation module 312 can perform a look-up, or some other search, to determine whether the intended recipient of the communication is associated with a policy. That is, the policy implementation module 312 can query the policy database 114 to determine whether the identifier corresponding to the intended recipient is associated with a policy. Based at least in part on determining that the identifier is associated with a policy, the policy implementation module 312 can determine whether the policy is valid, as described below with reference to FIG. 6. Based at least in part on determining that the policy is valid, the policy implementation module 312 can determine that the policy is to be applied to the communication.

Block 408 illustrates updating the header to include data indicating at least a portion of the policy. As described above, based at least in part on determining that the policy is to be applied to the communication, the policy implementation module 312 can send an instruction to the header module 314 to update the header of the communication based on the policy. In at least one example, the header module 314 can change the intended recipient of the communication by replacing the identifier corresponding to the intended recipient with a new identifier corresponding to the new destination. For instance, in the non-liming example, the header module 314 can change the identifier corresponding to the intended recipient indicated in the header to an alternate identifier corresponding to a voice mailbox associated with the identifier, an alternate identifier associated with a different device, and/or an alternate identifier associated with the first user device. In additional and/or alternative examples, the header module 314 can add at least a portion of the policy to the header.

Block 410 illustrates transmitting the communication based at least in part on the header. Based on the header module 314 updating the header, the policy implementation module 312 can send the communication to the server communication module 306 and the server communication module 306 can transmit the communication pursuant to the header (which can reflect at least a portion of the policy). For instance, if the header indicates that a communication is to be re-routed to an alternate identifier (e.g., associated with a voice mailbox, a user device different than the first user device, and/or another line or account associated with the first user device), the sever communication module 306 can send the communication to an entity associated with the alternate identifier. Or, if the header indicates that a communication is to be held (e.g., transmission delayed) until a particular time, the server communication module 306 can delay transmission of the communication until the particular time.

FIG. 5 illustrates an example process 500 for establishing a policy that can be stored at and/or implemented by one or more servers.

Block 502 illustrates receiving, from a user device, a request to initiate a policy. In at least one example, the policy module 208 can send a request to initiate a policy to the server(s). For instance, a user operating the user device 200 can interact with a web portal, an application, etc. to generate and send the request to initiate the policy.

Block 504 illustrates sending one or more policy options to the user device. The database management module 308 can receive the request and can send one or more policy options to the user device 200. In an example, the policy module 208 can receive one or more policy options from the database management module 308. The one or more policy options can include various operations that can be effectuated by the policy implementation module 312 for handling communications that are directed to a particular identifier. Furthermore, the one or more policy options can include various constraints that can be applicable to the operations, as described above.

Block 506 illustrates receiving a policy from the user device, the policy being associated with at least one policy option of the one or more policy options. In some examples, the user can provide input to specify the operation(s) of the policy and/or the constraint(s) of the policy, as described above. The policy module 208 can send data indicating policy option(s) input by the user to the database management module 308. The database management module 308 can receive the data associated with the policy option(s), which collectively define the policy. As described above, in some examples, the database management module 308 can receive data associated with policy option(s) without sending the one or more policy options to the user device 200, for instance when one or more policy options are stored locally on the user device 200.

Block 508 illustrates mapping, or otherwise associating, the policy with a profile associated with an identifier. In at least one example, the data associated with the policy can be associated with an identifier. As described above, the database management module 308 can utilize the identifier to map, or otherwise associate, the policy with the identifier, which can be associated with a user profile in the profile database 310. That is, the database management module 308 can map, or otherwise associate, data identifying the policy with the identifier.

In some examples, the database management module 308 can experience a problem (e.g., network connectivity, etc.), which can result in an error when the database management module 308 is attempting to process the data and/or map, or otherwise associate, the policy with the identifier. In at least one example, the database management module 308 can try to process the data and/or map, or otherwise associate, the policy with the identifier again before sending an error notification or other failure notification to the user device. In some examples, the database management module 308 can retry a predetermined number of times before sending an error notification or other failure notification to the user device.

Block 510 illustrates sending an authentication notification to the user device. In at least one example, based at least in part on the database management module 308 mapping, or otherwise associating, the policy with the identifier, the database management module 308 can send an authentication notification to the user device (e.g., user device 200) indicating that the data associated with the policy has been received and processed by the database management module 308. In at least one example, the policy module 208 can receive the authentication notification from the database management module 308 indicating that the database management module 308 received the data indicating the policy option(s).

FIG. 6 illustrates an example process 600 for determining whether a policy is applicable to a communication and transmitting the communication based on an applicable policy.

Block 602 illustrates receiving a communication from a user device, the communication being associated with a header identifying an identifier as an intended recipient of the communication. As described above, in at least one example, the server communication module 306 can receive a communication from a user device. The communication can be associated with a header. As described above, the header can include source and destination addresses to identify a sender and intended recipient of the communication. The header can also include additional information which identifies a version (used to identify the IP version being used), a header length (used to identify a length of the header), a type of service, an IP precedence (used to identify a level of service a packet receives in a network), a differentiated services code point (used to identify a level of service a packet receives in a network), a total length (used to identify a length of the header and the communication), a protocol (used to determine which application the data is from or which application the data is for), etc.

Block 604 illustrates determining whether a profile associated with the identifier is associated with a policy. In at least one example, the policy implementation module 312 can access a communication received via the server communication module 306 to analyze the header associated with the communication. Based on analyzing the header, the policy implementation module 312 can determine an intended recipient of the communication. That is, the policy implementation module 312 can analyze the data associated with the header to determine an identifier corresponding to an intended recipient of the communication. The policy implementation module 312 can perform a look-up, or some other search, to determine whether the identifier corresponding to the intended recipient is associated with a policy. That is, the policy implementation module 312 can query the policy database 114 to determine whether the identifier corresponding to the intended recipient is associated with a policy. Based at least in part on determining that the profile is not associated with the policy, the server communication module 306 can transmit the communication based on the header, as illustrated in block 606.

Based at least in part on determining that the profile is associated with the policy, the policy implementation module 312 can determine whether the policy is valid (and therefore applicable to the communication), as illustrated in block 608. In at least one example, the policy implementation module 312 can analyze constraint(s) associated with the policy to determine whether the policy is valid. As described above, a constraint can correspond to a duration of operation, a geographical location of operation, a roaming status of operation, etc.

In at least one example, the policy implementation module 312 can access a time stamp associated with the communication (e.g., as indicated in the header) to determine, based on a duration constraint, whether a policy is applicable to the communication. If the communication is associated with a time that is within a duration of operation, the policy implementation module 312 can determine that the policy is valid and should be applied to the communication. If the communication is associated with a time that is not within the duration of operation, the policy implementation module 312 can determine that the policy is not valid and should not be applied to the communication. Or, in at least one example, the policy implementation module 312 can access a geographical location of the intended recipient to determine, based on a geographical location constraint, whether a policy is applicable to the communication. If the intended recipient (e.g., the user device associated with the identifier corresponding to the intended recipient) is in a geographical location where a policy is to be implemented, the policy implementation module 312 can determine that the policy is valid and should be applied to the communication. If the intended recipient (e.g., the user device associated with the identifier corresponding to the intended recipient) is outside of a geographical location where the policy is to be implemented, the policy implementation module 312 can determine that the policy is not valid and should not be applied to the communication. Additionally and/or alternatively, in at least one example, the policy implementation module 312 can access an indication as to whether the intended recipient is roaming to determine, based on a roaming status constraint, whether a policy is applicable to the communication. If the intended recipient (e.g., the user device associated with the identifier corresponding to the intended recipient) is roaming, the policy implementation module 312 can determine that the policy is valid and should be applied to the communication. Or, if the intended recipient (e.g., the user device associated with the identifier corresponding to the intended recipient) is not roaming, the policy implementation module 312 can determine that the policy is not valid and should not be applied to the communication.

Additionally and/or alternatively, the policy implementation module 312 can determine whether a communication is a type of communication to which a policy applies. For instance, a policy associated with communication holding may not be applicable for real-time communications. Accordingly, if a communication is a real-time communication, the policy implementation module 312 can determine that a policy associated with communication holding is not applicable to the communication and therefore is not valid. Or, if a communication is not a real-time communication, the policy implementation module 312 can determine that a policy associated with communication holding is applicable to the communication and therefore is valid. Moreover, in some examples, policies can be associated with expirations. That is, a policy can expire after a predetermined amount of time. In at least one example, the policy implementation module 312 can determine whether a policy has expired and, if the policy has expired, the policy implementation module 312 can determine that the policy is not valid. Or, in at least one example, the policy implementation module 312 can determine whether a policy has expired and, if the policy has not expired, the policy implementation module 312 can determine that the policy is valid.

Based at least in part on determining that the policy is not valid, the server communication module 306 can transmit the communication based on the header, as illustrated in block 606. Based at least in part on determining that the policy is valid, the header module 314 can update the header based on the policy, as illustrated in block 610, and the server communication module 306 can transmit the communication based on the updated header, as illustrated in block 606. Based at least in part on determining that the policy is valid, the policy implementation module 312 can send an instruction to the header module 314 to update the header of the communication based on the policy. In at least one example, the header module 314 can change the intended recipient of the communication by replacing the identifier corresponding to the intended recipient in the header with another identifier corresponding to the new destination. For instance, in the non-liming example, the header module 314 can change the identifier corresponding to the intended recipient indicated in the header, which may be associated with a particular user device, to an alternate identifier corresponding to a voice mailbox associated with the identifier, an alternate identifier associated with a different device, and/or an alternate identifier associated with the particular user device. In additional and/or alternative examples, the header module 314 can add at least a portion of the policy to the header. Based on the header module 314 updating the header, the policy implementation module 312 can send the communication to the server communication module 306 and the server communication module 306 can transmit the communication pursuant to the updated header (which can reflect at least a portion of the policy).

Although the subject matter has been described in language specific to structural data items and/or methodological acts, it is to be understood that the subject matter defined in the appended claims is not necessarily limited to the specific data items or acts described. Rather, the specific data items and acts are disclosed as exemplary forms of implementing the claims.

What is claimed is:

1. A system comprising:
   one or more processors;
   memory; and
   a plurality of programming instructions stored on the memory and executable by the one or more processors to perform operations comprising:
   receiving, from a first user device operated by a user, a policy associated with routing one or more communications addressed to a first identifier to a second identifier, wherein the first user device is associated with multiple lines, the first identifier corresponds to a first line of the multiple lines, and the second identifier corresponds to a second line of the multiple lines;
   receiving a communication from a second user device, the communication being associated with a header identifying the first identifier as an intended recipient of the communication;
   replacing, based at least in part on the policy, the first identifier in the header with the second identifier;
   adding, based at least in part on the policy, data to the header indicating at least a portion of the policy; and
   transmitting, based at least in part on the header, the communication to an entity associated with the second identifier,
   wherein the policy is associated with a duration constraint, the duration constraint corresponding to a period of time for implementing the policy.

2. The system as claim 1 recites, wherein the entity is a voice mailbox.

3. The system as claim 1 recites, wherein the entity is a third user device.

4. A system comprising:
   one or more processors;
   memory; and
   a plurality of programming instructions stored on the memory and executable by the one or more processors to perform operations comprising:
   receiving, from a first user device operated by a user, a policy associated with handling one or more communications directed to a first identifier, wherein the first user device is associated with multiple lines and the first identifier corresponds to a first line of the multiple lines;
   receiving a communication from a second user device, the communication being associated with a header identifying the first identifier as the intended recipient of the communication;
   updating, based at least in part on the policy, the header to include data indicating at least a portion of the policy; and
   transmitting the communication based at least in part on the header,
   wherein the policy provides one or more instructions for re-routing the one or more communications in which the first identifier is the intended recipient to a second identifier corresponding to a second line of the multiple lines, and
   wherein the policy is associated with a duration, the duration based at least in part on a specified start time for starting implementation of the policy and a specified end time for ending implementation of the policy.

5. The system as claim 4 recites, wherein the policy provides one or more instructions for re-routing the one or more communications directed to the first identifier to the second identifier, wherein the second identifier is associated with a different user device than the first identifier.

6. The system as claim 4 recites, wherein:
   the policy provides one or more instructions for delaying transmission of the one or more communications; and
   the operations further comprise:
   determining an expiration of at least one of the duration or the policy; and
   transmitting the communication to an entity corresponding to the first identifier based at least in part on the expiration of the at least one of the duration or the policy.

7. The system as claim 4 recites, wherein updating the header further comprises replacing the first identifier with the second identifier.

8. The system as claim 4 recites, the operations further comprising:
   performing a look-up operation of a database to determine whether a profile associated with the first identifier is associated with a particular policy;
   determining that the profile is associated with the policy;
   determining that the policy is valid; and
   updating the header responsive to determining that the policy is valid.

9. The system as claim 8 recites, wherein determining that the policy is valid is based at least in part on one or more constraints associated with the policy, the one or more constraints including a duration constraint, a geographical location constraint, or a roaming constraint.

10. A computer-implemented method comprising:
    receiving, from a first user device, a policy associated with handling one or more communications directed to a first identifier, wherein the first user device is associated with multiple lines and the first identifier corresponds to a first line of the multiple lines;
    receiving a communication from a second user device, the communication being associated with a header identifying the first identifier as an intended recipient of the communication;
    determining that the policy is to be applied to the communication;
    updating the header to include data indicating at least a portion of the policy; and transmitting the communication based at least in part on the header, wherein the policy provides one or more instructions for re-routing the one or more communications in which the first identifier is the intended recipient to a second identifier corresponding to a second line of the multiple lines, and wherein the policy is associated with a duration constraint, the duration constraint corresponding to a period of time for implementing the policy.

11. The computer-implemented method as claim 10 recites, further comprising:

receiving, from the first user device, a request to initiate a policy;

sending, to the first user device, one or more policy options; and receiving the policy responsive to sending the one or more policy options, the policy corresponding to at least one policy option of the one or more policy options.

12. The computer-implemented method as claim 10 recites, further comprising, based at least in part on receiving the policy, sending an authentication notification to the first user device, the authentication notification confirming receipt of the policy.

13. The computer-implemented method as claim 10 recites, wherein the policy provides one or more instructions for delaying transmission of the one or more communications until expiration of at least one of the period of time or the policy.

14. The computer-implemented method as claim 10 recites, wherein the one or more instructions for re-routing the one or more communications include one or more instructions for re-routing the one or more communications to the second identifier instead of the first identifier until expiration of at least one of the period of time or the policy.

* * * * *